(12) United States Patent
Vijayan et al.

(10) Patent No.: US 10,532,676 B2
(45) Date of Patent: Jan. 14, 2020

(54) REMOVABLE CAR SEAT COVER HAVING A PREDETERMINED PRE-WEAKENED FAILURE ZONE OF A KNOWN BURSTING STRENGTH FOR FACILITATING RELIABLE AIRBAG DEPLOYMENT

(71) Applicant: Custom Accessories Inc., Richmond, IL (US)

(72) Inventors: Arun Vijayan, Highton (AU); Amit Jadhav, Reservoir (AU); Rajiv Padhye, Narrewarren (AU)

(73) Assignee: Custom Accessories Inc., Richmond, IL (US)

( * ) Notice: Subject to any disclaimer, the term of this patent is extended or adjusted under 35 U.S.C. 154(b) by 313 days.

(21) Appl. No.: 15/122,832

(22) PCT Filed: Apr. 10, 2015

(86) PCT No.: PCT/AU2015/050164
§ 371 (c)(1),
(2) Date: Aug. 31, 2016

(87) PCT Pub. No.: WO2015/154147
PCT Pub. Date: Oct. 15, 2015

(65) Prior Publication Data
US 2017/0072822 A1  Mar. 16, 2017

(30) Foreign Application Priority Data
Apr. 10, 2014  (AU) .................................. 2014901323

(51) Int. Cl.
*B60N 2/60* (2006.01)
*B60R 21/207* (2006.01)
(Continued)

(52) U.S. Cl.
CPC .............. *B60N 2/60* (2013.01); *B23K 26/364* (2015.10); *B60R 21/207* (2013.01);
(Continued)

(58) Field of Classification Search
CPC .......... B60R 2021/2076; B60R 21/207; B60R 21/2165; B60N 2/60; B60N 2002/5808; B23K 26/364
(Continued)

(56) References Cited

U.S. PATENT DOCUMENTS 5,234,252 A * 8/1993 Wallach ............... B60N 2/6036
297/220
5,682,771 A  11/1997 Forest et al.
(Continued)

FOREIGN PATENT DOCUMENTS

AU    2015101116 A4 * 10/2015
CN    102015378 A    4/2011
(Continued)

OTHER PUBLICATIONS

Australian Patent Office; Search Report in International Patent Application No. PCT/AU2015/050164 dated Jun. 1, 2015; 3 pages.
(Continued)

*Primary Examiner* — Milton Nelson, Jr.
(74) *Attorney, Agent, or Firm* — Leydig, Voit & Mayer Ltd

(57) ABSTRACT

A removable car seat cover for a car seat having an integral side airbag including a side panel having a predetermined pre-weakened failure zone that is pretreated by controlled laser ablation of the side panel. The pre-weakened failure zone is located at or adjacent to an airbag deployment area of a car seat when the car seat cover is installed on the car seat, and is in the form of an elongate strip extending along the side panel. The pre-weakened failure zone has a known
(Continued)

bursting strength to thereby facilitate reliable deployment of the side airbag from the car seat as a result of tearing of the pre-weakened zone when the removable car seat cover is installed thereon.

17 Claims, 5 Drawing Sheets

(51) Int. Cl.
*B60R 21/2165* (2011.01)
*B23K 26/364* (2014.01)
*B60N 2/58* (2006.01)

(52) U.S. Cl.
CPC .. *B60R 21/2165* (2013.01); *B60N 2002/5808* (2013.01); *B60R 2021/2076* (2013.01)

(58) Field of Classification Search
USPC .................................. 297/219.1, 218.1, 229
See application file for complete search history.

(56) References Cited

U.S. PATENT DOCUMENTS

| | | |
|---|---|---|
| 6,140,602 A | 10/2000 | Costin |
| 6,254,122 B1 | 7/2001 | Wu et al. |
| 6,294,124 B1 | 9/2001 | Bauer et al. |
| 7,100,941 B2 | 9/2006 | Riha et al. |
| 7,857,383 B2 * | 12/2010 | Nguyen ............... B60N 2/5825 297/218.1 |
| 2006/0151919 A1 | 7/2006 | Renner et al. |
| 2007/0040426 A1 * | 2/2007 | Kenny ................. B60N 2/6018 297/229 |
| 2012/0038131 A1 | 2/2012 | Muller et al. |

FOREIGN PATENT DOCUMENTS

| | | |
|---|---|---|
| DE | 19648529 C1 | 5/1998 |
| DE | 102007061848 A1 | 6/2009 |
| DE | 102007061849 A1 | 6/2009 |
| JP | H10119694 A | 5/1998 |
| JP | 2006506232 A | 2/2006 |
| JP | 2014040222 A | 3/2014 |

OTHER PUBLICATIONS

European Patent Office; Supplementary Searc Report in related European Patent Application No. 15776879.7 dated Sep. 22, 2017; 7 pages.
Japanese Patent Office, Notice of Reasons for Rejection in JP2017-504208, dated Feb. 8, 2019.
Chinese Patent Office, First Office Action in CN Application No. 201580030964.3, dated Apr. 4, 2018.
Chinese Patent Office, Second Office Action in CN Application No. 201580030964.3, dated Jan. 21, 2019.
European Patent Office; Examination Report in European Patent Application No. 15776879.7, dated Feb. 27, 2019.

* cited by examiner

| Power Level (%) | Bursting strength (kPa) |
|---|---|
| 7 | 325.0 |
| 8 | 259.0 |
| 9 | 248.0 |
| 10 | 217.0 |
| 11 | 207.5 |
| 12 | 174.1 |
| 13 | 156.0 |

REMOVABLE CAR SEAT COVER HAVING A PREDETERMINED PRE-WEAKENED FAILURE ZONE OF A KNOWN BURSTING STRENGTH FOR FACILITATING RELIABLE AIRBAG DEPLOYMENT

FIELD OF THE INVENTION

The present invention generally relates to removable/additional car seat covers, and in particular to removable/additional car seat covers for the facilitation of reliable airbag deployment, particularly for use in motor vehicles with concealed side-torso air bag system embedded in the car seat.

BACKGROUND OF THE INVENTION

The use of airbags in cars and other passenger vehicles helps to reduce injuries and prevent death from the external collision, and also helps to limit passenger collisions with the inside of the car. Airbags were first introduced in passenger cars by Ford in 1971 to protect the driver and front passenger in frontal collisions. Since then, the number of airbags in modern cars has increased to 5 and in some cases even 9, covering a wide range of accident scenarios.

Generally, there are two types of side airbag systems employed in the car seats. One with airbag installed on the side of car seat in the form of a visible, discreet door and the other is embedded in the under the foam layer of the upholstery. The use of removable/additional car seat covers in recent years, has gained popularity for reasons such as aesthetic appeal and protection of the upholstery. These seat covers are installed over the car seat upholstery and allow for the flexibility to change when desired and washed repeatedly.

Several manufacturers have introduced removable car seat covers with a rupturable seam known as a 'tear seam' along edge of the side panel of the seat cover to allow the deployment of the integrated side airbag concealed in the upholstery of car seat. However, many of these removable seat cover designs with 'tear seams' have been identified as having reliability issues during airbag deployment, due to several technical and design deficiencies.

Removable seat covers designed for side airbags generally deploy by rupturing the tear seam. The tear seam within the removable car seat cover must not prevent the full deployment of the airbag. The airbag deployment is executed with an enormous force which is responsible for the seam tearing. Until date this mechanism has been adopted commercially in removable car seat cover designs. However, the behaviour of tear seams in removable car seat covers can be unpredictable. Several factors such as seat cover material, type of sewing thread used at the tear seam, length of the tear seam, placement of the tear seam, and the type of stitch, affect the behaviour of airbag deployment.

Various problems can impact seam tear performance such as;

(a) the occurrence of ballooning of the removable seat cover material prior to the failure of the seam. This increases the time taken for the airbag deployment and hence reduces the effectiveness of the airbags.

(b) the improper and unsafe deployment of the airbag due to minor faults present in the seat-cover material such as holes, tears, rips or snags, which cause the inappropriate and incomplete exit of the airbag.

It would therefore be advantageous to provide an alternative means in a removable car seat cover to facilitate reliable airbag deployment in a car seat having an integrated side airbag.

Laser technology has been used in the textile industry for cutting of fabrics; engraving designs on fabrics and carpets; fabric pre-treatment to enhance fixation of dyes or treating of polymers to improve adhesion properties; and etching of graphics patterns on to the face of a material. Other methods such as UV weakening, caustic soda treatments of fabrics, including weakened yarns within a knitted or woven structure in strategic locations by changing the yarn inputs during manufacture have also been explored.

The concept of applying laser to a fabric material for the alteration of physical properties, specifically to pre-weaken the tensile strength of the fabric, leather, or polymeric materials used as trim cover of an airbag has been documented. U.S. Pat. No. 7,100,941 (Riha et al.) refers to the use of laser cutting beam based on an optical system which focuses the laser beam on fabric to facilitate cutting in a predetermined pattern for strategic weakening of fabrics applied to trim panels in the interior of a car that cover the exit points for the airbags. This U.S. patent is therefore directed toward providing a weakened portion of fabric moulded to underlying moulded dashboard using laser technology. While it is suggested that the invention may also be integrated into the knee bolster area, the steering wheel hub, or other areas in the interior of the vehicle including, but not limited to seats, headliner, Philip trim door panels, quarter panels, and roof rails, reference is not specifically made to seat covers subsequently applied as extra trim over the upholstery of a seat.

U.S. Pat. No. 6,140,602 (Costin), describes the application of laser beam to impart patterned designs on thin fabric and leather using an electronic controller to provide a signal to the drive mechanism for controlling the speed of etching.

U.S. Pat. No. 6,294,124 (Bauer et al.) discloses the use of controlled laser beam to weaken the back of the cover layer by cutting through the substrate and partially through the cover layer to produce grooves of a precise depth and width.

The concept of using laser to pre-weaken the tensile strength of fabrics is therefore not new, and as discussed above, can be used to impart cosmetic appeal and in some cases functional attributes such as facilitate airbag deployment. However there still exists the need for the development and demonstration of pre-weakening of fabrics to allow for reliable, predictable and timely deployment of airbags through the tearing of fabric. While many of such patents have attempted to modify fabric surfaces using laser to allow for deployment, the concept of pre-determined zone of known bursting strength of fabric to allow for reliable, predictable and timely deployment of airbags through the pre-weakened fabric has not been demonstrated.

In addition, there are several challenges that can be encountered when using the pre-weakening concept on removable car seat covers. Removable car seat covers unlike fixed trims and face fabrics that are adhered to the foam of the car seat (as in the case of OEM car seats) can distort and result in misalignment from the actual deployment zone. This is a serious performance issue and therefore warrants the need for development of a pre-weakened predetermined zone with of a known bursting strength in close proximation to the airbag exit point.

It is therefore an object of the present invention to provide a removable car seat cover, and a method of producing a removable car seat cover having a predetermined pre-weakened failure zone of known bursting strength for facilitating reliable side airbag deployment from a car seat.

SUMMARY OF THE INVENTION

According to one aspect of the present invention, there is provided a removable car seat cover for a car seat having an integral side airbag; including a side panel having a predetermined pre-weakened failure zone pretreated by controlled laser ablation of the side panel; wherein the pre-weakened failure zone is located at or adjacent to an airbag deployment area of a car seat when the car seat cover is installed on the car seat and is in the form of an elongate strip extending along the side panel; and wherein the pre-weakened failure zone has a known bursting strength to thereby allow for reliable deployment of the side airbag from the car seat as a result of tearing of the pre-weakened zone when the removable car seat cover is installed thereon.

According to another aspect of the present invention, there is provided a method of producing a removable car seat cover for a car seat having an integral side airbag; the method including pretreating a side panel of the car seat cover by controlled laser ablation to thereby form at least one predetermined pre-weakened failure zone having a known bursting strength; wherein the pre-weakened failure zone is located at or adjacent to an airbag deployment area of a car seat when the car seat cover is installed on the car seat and is in the form of an elongate strip extending along the side panel; and wherein the pre-weakened failure zone has a known bursting strength to thereby allow for reliable deployment of the side airbag from the car seat as a result of tearing of the pre-weakened zone when the removable car seat cover is installed thereon.

The car seat cover may be produced from a textile material, leather or a polymeric material backed with textile liner. The pre-weakening can be accomplished by ablating the fabric using laser technology that can allow for dot or line patterns to be engraved on the textile material. The side panel of the car seat cover may be made from a knitted polyester fabric preferably having a weight of 100 grams per square meter, and be 100% polyester yarn of 100 Denier with 36 filaments per yarn.

The use of a pre-weakened failure zone within the fabric itself eliminates the need to use conventional tear seam technology in the deployment of an integrated airbag thereby avoiding the various problems associated with such technology. The provision of a pre-weakened zone within the fabric facilitates the full and timely deployment of side bags incorporated in a car seat. The force of deployment of the airbag is sufficient to break through the weakened failure zone within the fabric when located over the deployment area of the airbag on a car seat.

The pre-weakened zone is thereby adapted to split and allow passage of an airbag therethrough when a force from expansion of the airbag is applied to the weakened zone.

The predetermined pre-weakened zone may preferably be ablated to a specific length and width in accordance to the car seat model and airbag design in close proximity to the airbag exit point. The failure zone within the fabric may preferably be pre-treated using laser ablation to weaken the fabric at predetermined zone. The pre-weakened zone may preferably be elongated in shape. This will facilitate in particular the production of car removable seat covers suitable for use on a variety of different car seats from different manufacturers. The elongate shape of the pre-weakened zone will then help to ensure that the car removable seat cover can take into account the variations in the location of the side airbag in different car seats, and will help to ensure that a part of the weakened failure zone is located over the airbag deployment area.

The pre-weakened failure zone may be laser ablated on the fabric using different laser ablation machines and laser etching patterns. According to one preferred embodiment, the pre-weakened failure zone may be laser ablated by laser etching a dot pattern. This dot pattern may preferably have with a dot colour of K40, and a dot density of 400 dpi. According to another preferred embodiment, the pre-weakened failure zone may be laser ablated by a series of parallel laser etched lines. These laser etched lines may preferably be spaced about 0.5 mm apart, and at a 45 degree angle to an edge of the pre-weakened failure zone.

A predetermined elongate pattern may preferably be laser ablated to a side panel of the removable seat cover. The pattern may be in the form of a generally vertical strip extending along the side of the car seat cover when installed on a car seat. The strip may preferably be approximately 740 mm in length and 7 mm in width. The strip may be located at a gap of approximately 10 mm to 15 mm from a front edge of the car seat cover, and less than 50 mm to 100 mm from a bottom edge of the car seat cover when installed on the car seat. More preferably, the strip may be spaced less than 15 mm from the front edge of the car seat cover, and less than 100 mm from the bottom edge of the car seat cover.

Therefore, the present invention provides a car removable seat cover made from a fabric including at least one pre-weakened zone within the fabric, wherein the weakened failure zone is located over an airbag deployment area of a car seat when the car removable seat cover is installed thereon, such that the failure zone is adapted to split and allow passage of an airbag therethrough when a force from expansion of the airbag is applied to the weakened failure zone.

Testing was also conducted of the fabrics for bursting strength to determine the optimal laser conditions to allow for reliable, unobstructed deployment of airbag during an event of collision without affecting the durability of the car seat cover. The durability of the car seat covers were also tested for durability under standard test procedures.

In particular, washing tests under Australian Standards to ensure that the car seat covers can be removed and washed without impacting the performance or affecting the aesthetic qualities of the pre-weakened fabric were successfully conducted.

Furthermore, UV exposure testing where the predetermined pre weakened zone of an optimal known bursting strength was subjected to an accelerated UV exposure after an accelerated UV exposure in accordance to SAE J2412/J2413 to artificial UV radiance were successfully conducted to ensure that the pre-weakened zone sustained its performance after that exposure.

In addition, commercial airbag testing and verification under different environment conditions such as ambient (20° C.±2° C.), cold (−35° C.±4° C.), and hot (85° C.±5° C.) were also successfully conducted.

BRIEF DESCRIPTION OF THE DRAWING

It will be convenient to further describe the invention with respect to the accompanying drawings which illustrate a preferred embodiment of the method according to the present invention. Other embodiments of the invention are possible, and consequently, the particularity of the accompanying drawings is not to be understood as superseding the generality of the preceding description of the invention.

In the drawings.

DETAILED DESCRIPTION OF THE INVENTION

Figure 1:
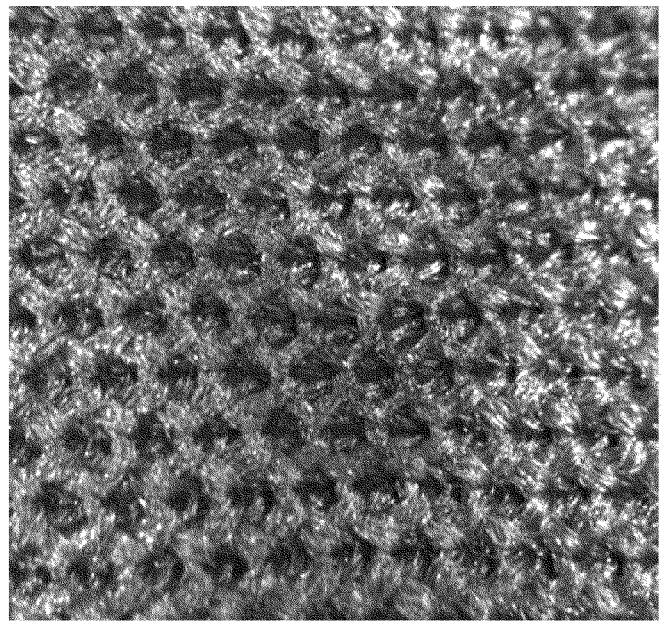
FIG. 1 is an image showing the surface of fabric that has been modified using laser ablation according to the present invention.

The removable car seat cover, and a method of producing a removable car seat cover according to the present invention provides a novel means for ensuring optimal and reliable airbag deployment in a car seat having an integrated side airbag. This is achieved according to the present invention by providing a removable car seat cover having a predetermined pre-weakened failure zone with a known bursting strength within the side panel of the car seat itself eliminating the need for tear seam technology.

A fundamental criteria for the effective/reliable deployment of a side air bag during an accident is that the airbag must be fully deployed within 16 ms from initial actuation of that air bag. This ensures that the side airbag can effectively protect the occupant of the vehicle if that vehicle is involved in an accident. The side airbag also needs to be inflated in a forward direction around 45 degrees to the plane of the seat side so that the side airbag is located at the side of an occupant seated in that vehicle seat once fully deployed. Therefore, a removable car seat cover for a car seat having an integrated side airbag according to the present invention must allow the side airbag to be deployed within 160 s. In addition, the removable car seat cover according to the present invention should preferably also allow for unimpeded deployment of the airbag in the above noted forward direction.

The weakened failure zone within the side panel of the car seat cover may preferably be formed by using laser ablation according to the present invention. Laser ablation provides a means of precisely defining the failure zone within the car seat cover. The laser ablation acts to etch the surface of the fabric and thereby weaken binding points of the yarn within the fabric. Deployment of the side airbag would then result in the tearing of the weakened failure zone to allow the side airbag to pass though the tear and be fully deployed.

In order to ensure reliable side airbag deployment, the side panel of the car seat cover must be produced having the predetermined weakened failure zone so that the side panel has a known bursting strength. Commercial deployment tests were therefore conducted to determine the optimum bursting strength of the side panel that would enable reliable deployment of the side airbag under 16 ms while maintaining the durability of the fabric of the side panel under typical use conditions. These tests also helped to determine the optimum position and configuration of the weakened failure zone to facilitate deployment of the side airbag in the forward direction. In these commercial tests, the car seat cover having a side panel laser ablated according to the present invention would be placed on a car seat shaped mould having an inbuilt side airbag, the airbag being deployed while the airbag deployment was being videoed so that the actual physical displacement and time lapse of the airbag deployment could be recorded.

The research for determining the optimum bursting strength for the side panel were separately conducted on two different laser ablation machines, the first being an Epilog legend 36 EXT laser machine based on dot matrix printing concept, the second being a faster Donglei laser cutting machine. The fabric used in the tests was knitted from 100 Denier textured polyester yarn that was comprised of 36 monofilaments. This fabric was tested to have a bursting strength of between 750 to 780 kPa prior to any laser ablation of that fabric. It should however be noted that the present invention is not limited to this particular fabric, and that the use of alternative fabrics is also envisaged. The fabric that could be used for laser ablation according to the present invention may however preferably having a weight of between 80 to 120 grams per square meter.

The dot matrix laser machine is a $CO_2$ laser and has a maximum laser power of 60 W. This dot matrix laser machine can 'print' a specific laser etched dot pattern on the fabric, the printing being controlled by Adobe Illustrator software. Four separate operational parameters of the dot matrix laser machine were varied to thereby obtain the optimum operational parameter for producing the weakened failure zone in the fabric, namely the dot colour, laser power, laser speed and dot density (dpi). The intensity of the laser was optimised by:

a) Modifying the depth of the dot colour between grey colours ranges from K5 (lighter) to K60 (darker), the darker the shade, the more the intensity of ablation.

b) Varying the dots per inch between 200 to 600 dpi, the higher the dpi, the more the number of weakened spots in the fabric.

The optimum operational parameters that were determined for the dot matrix laser machine was a K40 dot colour, 50% laser power, 100% laser speed, and 400 dpi. These operational parameters produced a side panel having a pre-weakened failure zone with a bursting strength of 200 to 220 kPa when the car seat cover was tested in the commercial deployment tests. It has been found that this bursting strength ensures reliable deployment of the side airbag while at the same time ensuring that the fabric maintains its durability during typical use conditions. Further tests on the durability of the fabric have also been conducted and will be subsequently described.

The Donglei laser cutting machine also uses a CO2 laser but has a maximum laser power of 150 W. This laser machine ablates lines on the fabric, and has three operational parameters that were varied to control the laser ablation of the fabric, namely laser power, the distance between the ablated lines and the angle of the lines. The intensity of the laser was optimised by:

a) changing the scale of power incrementally from 1 to 20%; where the intensity of the ablation increased with higher laser power; and b) adjusting the distance between the lines between 0.1 mm to 0.5 mm, the lower the distance.

It was found that the optimum operational parameters were a laser speed of 2000 mm/sec, a laser power of between 9 to 11%, a line spacing of 0.5 mm and a line angle of 45 degrees. This also produced a pre-weakened failure zone in the side panel of the car seat cover having a bursting strength around 200 kPa.

Figure 2:
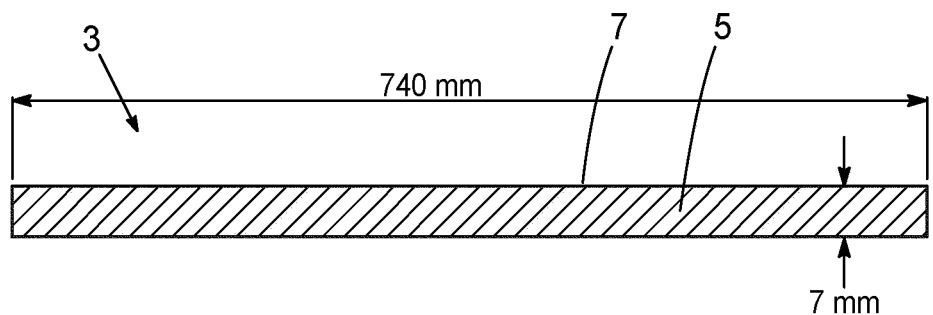
FIG. 2 is a diagram showing details of the laser etching strip on the side panel of the car seat cover according to the present invention.

FIG. 1 is an image of the fabric surface at the weakened failure zone of the side panel showing the surface modification on the fabric after laser ablation according to the present invention. FIG. 2 shows the optimal dimensions of the weakened failure zone laser ablated on the fabric by the Donglei laser machine. This zone is an elongate ablation strip 3 having a width of 7 mm and a length of 740 mm. Also shown in FIG. 2 are the series of parallel laser etched lines 5 spaced 0.5 mm apart and angled 45 degrees to the edge 7 of the weakened failure zone 3. The width of this zone 3 together with the above described optimal operational parameters also ensures that the side panel produced according to the present invention had a known bursting strength of around 200 kPa. As noted previously this bursting strength ensures reliable side airbag when a car seat cover according to the present invention is used. The length of the weakened failure zone was selected to take into account the different side airbag types and shapes used in the car seats of different vehicles. The length of the weakened failure zone ensures that the different airbag types can still be reliably deployed. The 45 degree angle of the laser lines is also good in maintaining the durability of the knitted structure of the fabric, and facilitates a uniform rate of tearing along the weakened failure zone.

Figures 3, 4:
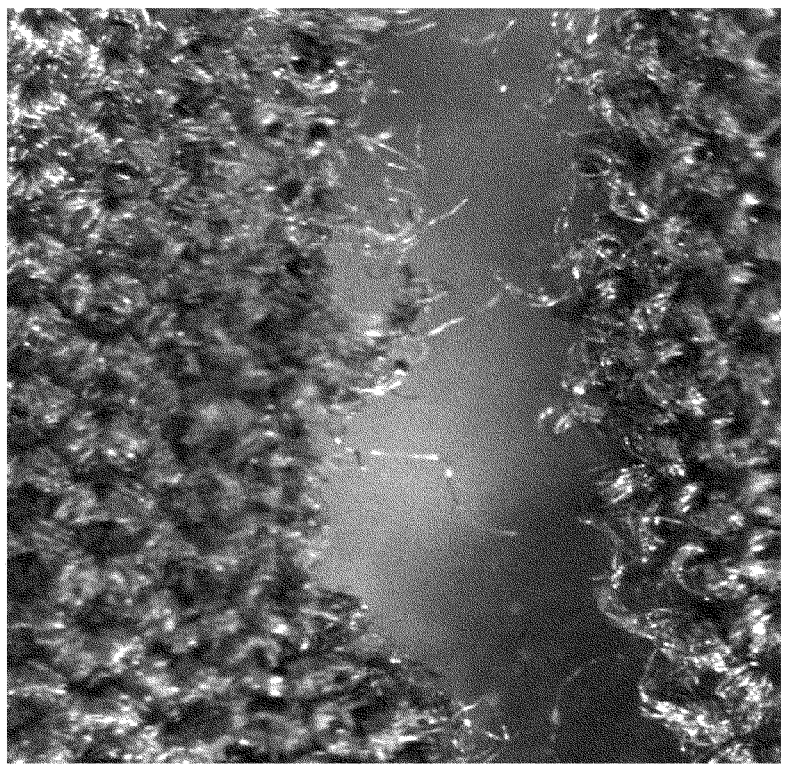
FIG. 3 is an image showing tearing of the surface of fabric that has been modified using laser ablation according to the present invention.
FIG. 4 is a table of test results showing the relationship between the bursting strength of the side panel having a predetermined pre-weakened failure zone, and the power level of the laser used to ablate the side panel.
Figure 7:
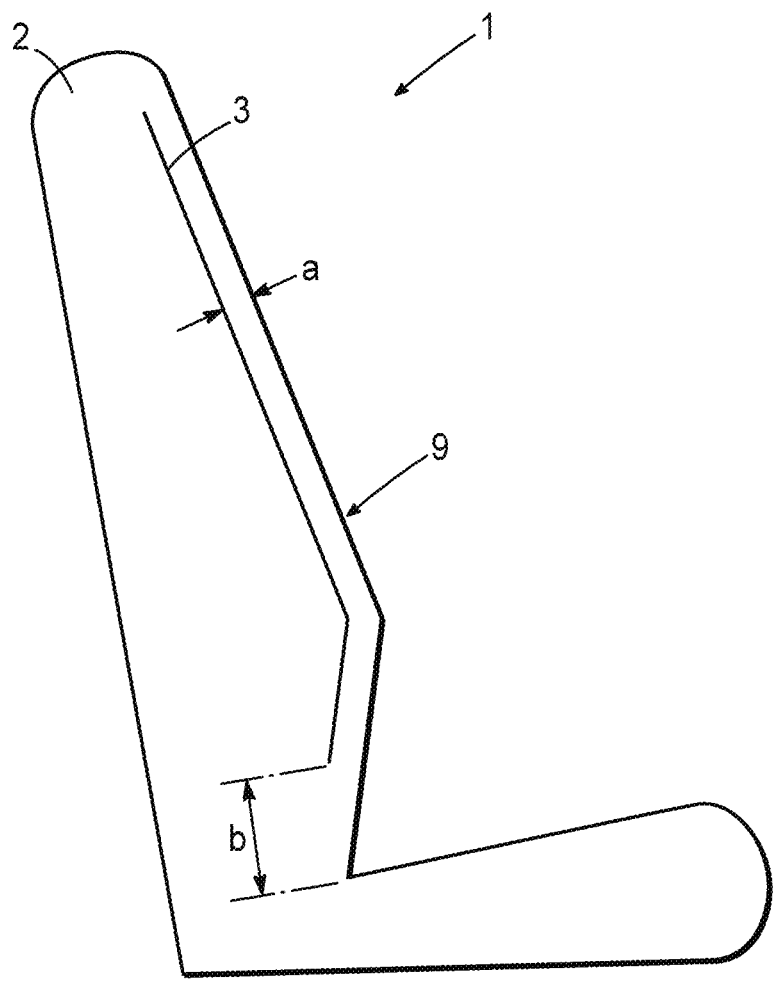
FIG. 7 is a side view of a car seat cover support on a car seat, and the position of the laser ablated strip with respect to an edge of the car seat cover.

FIG. 3 is an image of the fabric at the weakened failure zone showing the tearing of the fabric after side airbag deployment. FIG. 7 shows position of the ablation pattern band 3 providing the weakened failure zone on the side panel 2 of the car seat cover 1. Once the car seat cover is installed on a car seat having an internal side airbag, the laser ablation band position is as follows:

A gap a of less than 15 mm should be provided between the laser ablated line and front edge of the seat cover along the length of edge till bottom of the car seat cover.

The distance b between end point of the laser ablated line and bottom edge of the side panel should be less than 100 mm.

This thereby locates the ablated band over the location on the car seat where the airbag is deployed following actuation. The positioning of the ablation strip 3 (shown in FIG. 3) near the front seam 9 of the car seat cover 1 also facilitates side airbag deployment in the forward direction. In the commercial deployment tests conducted on the car seat covers, the airbag was actuated to investigate the performance of the laser ablated failure zone on the car seat cover that has been modified using laser ablation according to the present invention. Deployment of the airbag resulted in a tear being propagated through the laser ablation line thereby facilitating reliable deployment of the side airbag.

Figure 5:
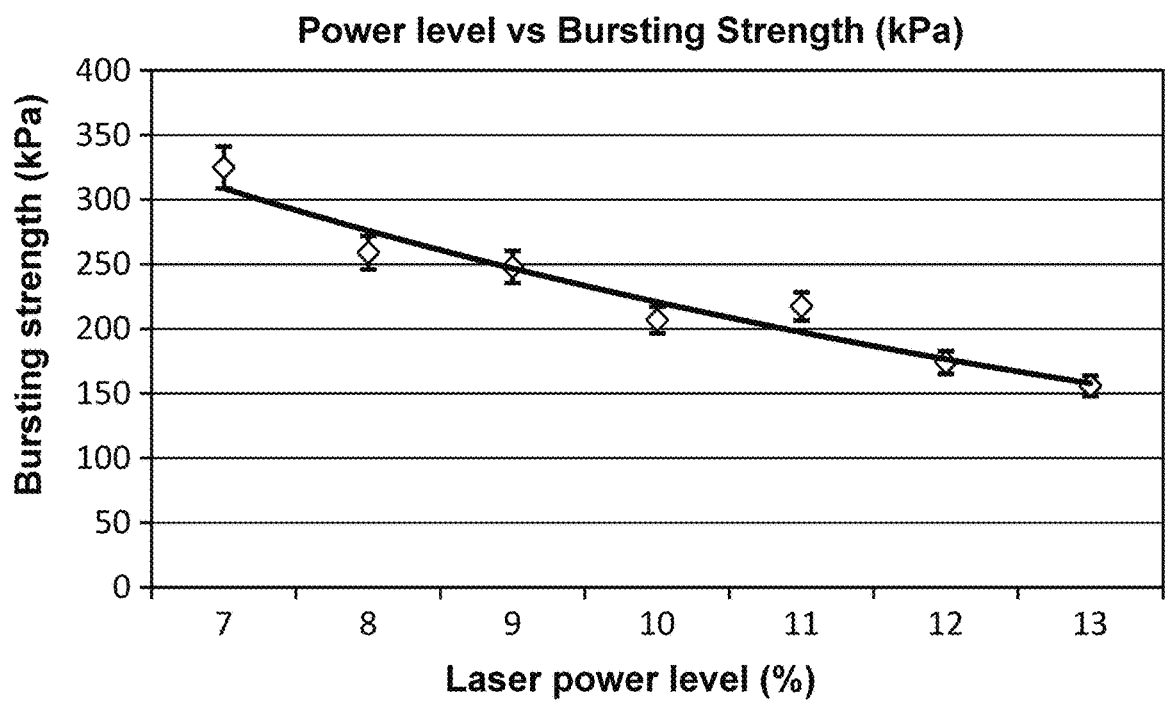
FIG. 5 is a graph showing the relationship between the bursting strength of the predetermined pre-weakened failure zone, and the power level of the laser used to ablate the side panel.

FIG. 4 shows a table providing results obtained from the deployment tests, where the side panel of the car seat cover had been laser ablated by the Donglei laser machine. The power level of the laser machine was varied between 7 to 13%, and the actual bursting strength of the side panel measured. The table shows that the bursting strength progressively decreased from 325.0 kPa to 156.0 kPa as the power level was increased. These results are shown graphically in FIG. 5 which illustrates this progressive reduction in the bursting strength of the side panel.

Figure 6:
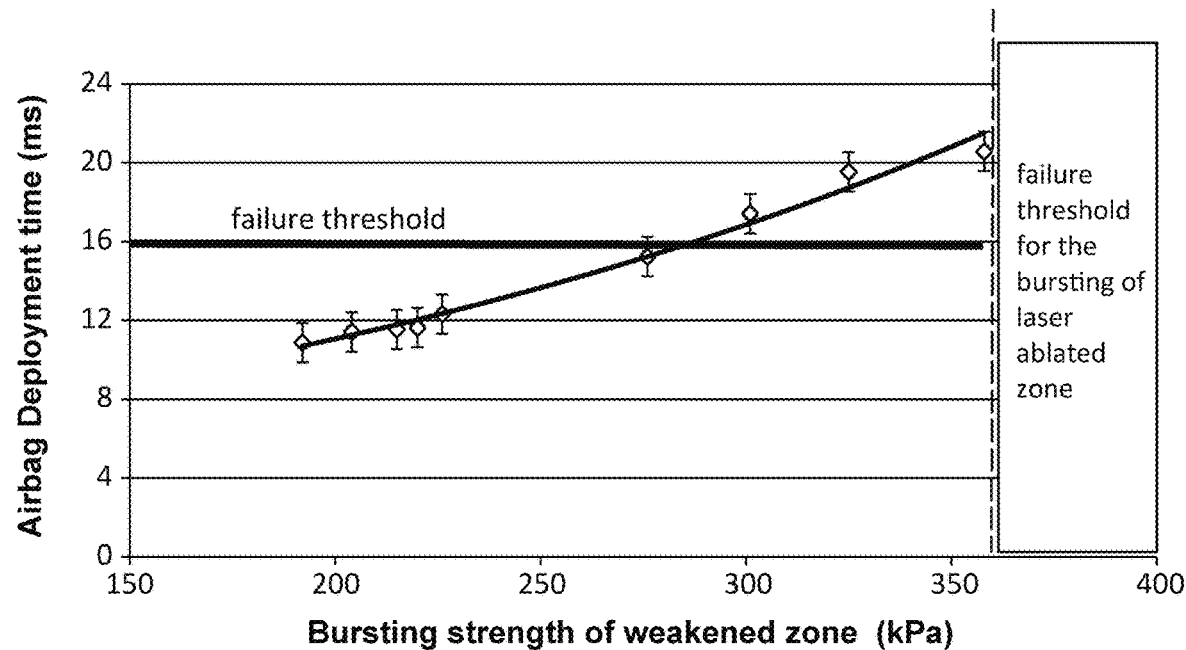
FIG. 6 is a graph showing the relationship of the bursting strength of the predetermined pre-weakened failure zone with the airbag deployment time.

FIG. 6 is a graph showing the relationship of the bursting strength of the weakened failure zone relative to the airbag deployment time. As noted previously, the airbag must deploy within 16 ms to ensure effective deployment of that airbag in an accident situation. This deployment time is shown as the 'failure threshold' line in FIG. 6. Therefore, the deployment time of the airbag must be below this failure threshold to ensure reliable deployment of the airbag. The relationship of the bursting strength of the weakened zone relative to the airbag deployment is shown in the line that mostly extends below the failure threshold line. FIG. 6 therefore shows that when the bursting strength is in the range of between 200 kPa to 220 kPa, the airbag deployment time is in the optimal range of between 10 to 11 ms. The airbag deployment time however exceeds the failure threshold of 16 ms when the bursting strength was greater than around 300 kPa. Having the bursting strength below 150 kPa however reduced the durability of the fabric can lead to the potential of premature tearing of the side panel during use.

The bursting strength of the pre-weakened failure zone was thereby reduced by around 70% as a result of the laser ablation of that area according to the present invention when compared with the bursting strength of the fabric that had not been laser ablated. This therefore results in improved reliability in the airbag deployment.

Further fabric durability tests have also been successfully conducted on car seat covers having side panels according to the present invention. These tests are as follows:

Washing tests according to Australian Standards to show that the car seat covers can be removed and washed without impacting the performance or affecting the aesthetic qualities of the pre-weakened side panel fabric;

UV exposure tests in accordance with SAE J2412/J2413 has shown that the pre-weakened failure zone of an optimal bursting strength sustains its performance after accelerated UV exposure to artificial UV radiance; and Temperature testing of under ambient (20 degrees C.), cold (−35 degrees C.) and hot (85 degrees C.) temperatures have shown that the car seat covers still work reliably.

Figure 8:
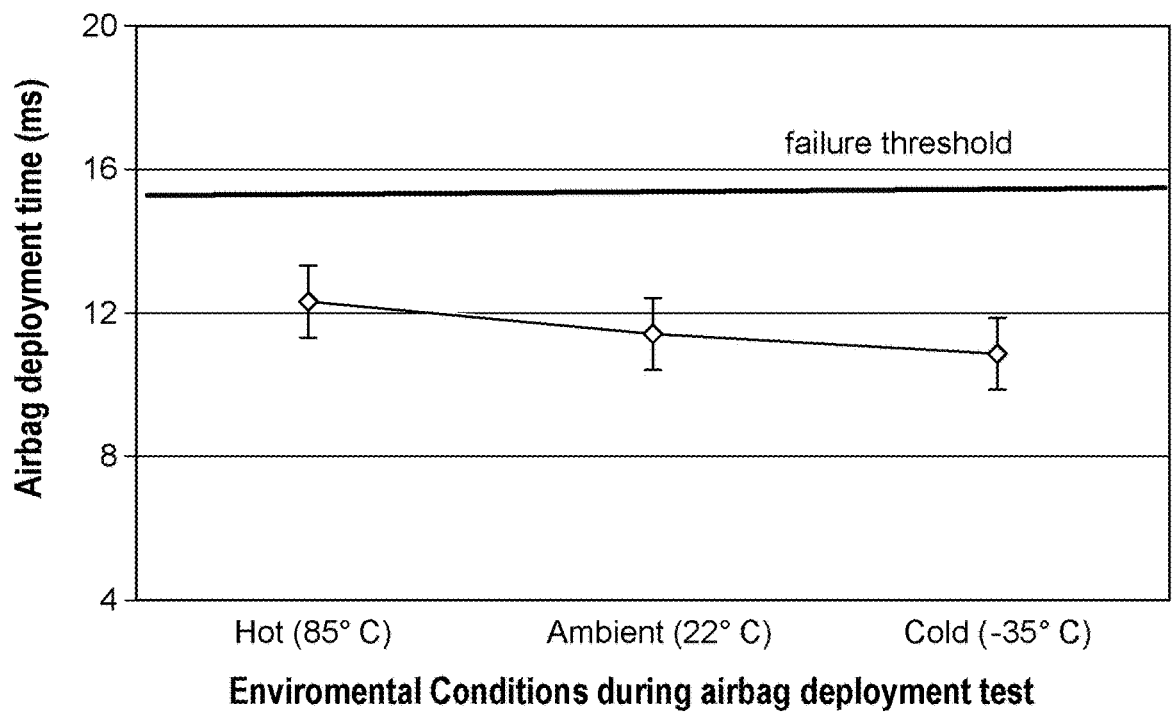
FIG. 8 is a graph showing the relationship of the airbag deployment time for the car seat cover having the predetermined pre-weakened failure zone tested in different environmental conditions.

FIG. 8 is a graph showing the effect that exposing the car seat cover with the predetermined pre-weakened failure zone under different environmental temperatures has on the on the airbag deployment time. The results show that there is only a small drop in the airbag deployment time with decreasing temperature, the airbag deployment time still remaining below the failure threshold of 16 ms.

Figure 9:
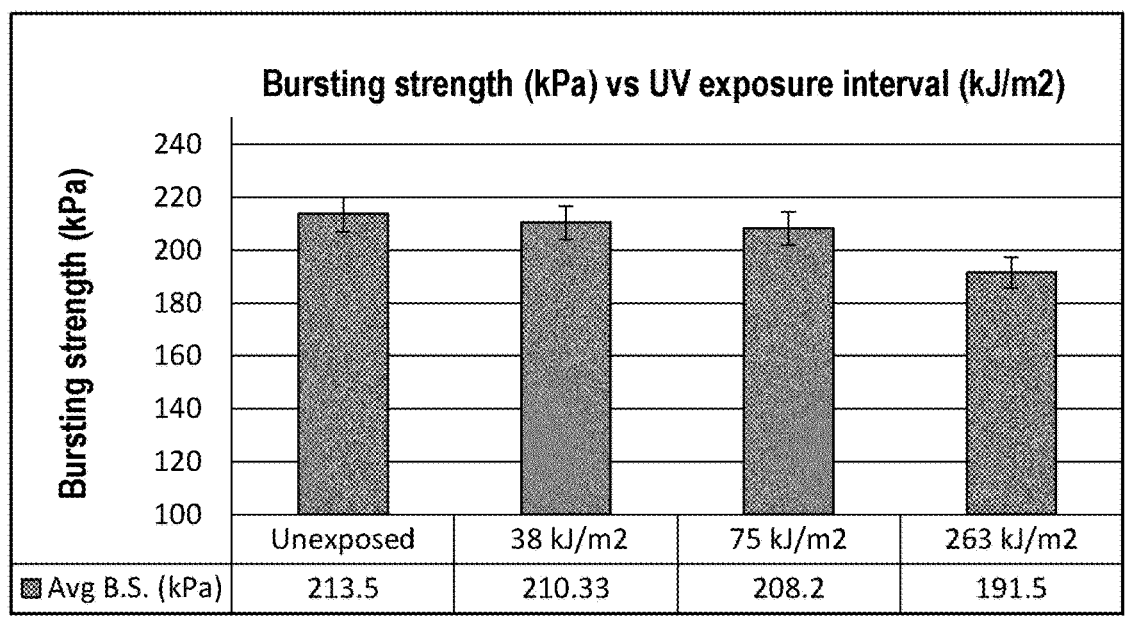
FIG. 9 is a graph showing the relationship of the bursting strength of the car seat cover having the predetermined pre-weakened failure zone after various UV exposure intervals.

FIG. 9 is a graph showing the effect that UV exposure has on the bursting strength of the car seat cover with the predetermined pre-weakened failure zone. It was observed that there was only a 9-10% reduction in the bursting strength of the pre-weakened failure zone after UV exposure of 263 kJ/m$^2$. This is deemed to be acceptable in accordance with the SAE J2412/2413 standards.

The car seat cover and the method of producing the side panel of a car seat cover according to the present invention therefore optimise the bursting strength of the pre-weakened failure zone at a known value to thereby ensure reliable deployment of a side airbag when the car seat cover is installed. The method of producing the pre-weakened failure zone is also independent of the laser technology being used as it is only necessary to ensure that the pre-weakened failure zone has a known bursting strength of around 200 kPa.

When compared with tear seam technology of the prior art, the car seat cover of the present invention has up to 100% airbag deployment results and provides superior protection against damage from friction, cuts, scrapes, grazes resulting from motion related activity by passenger or driver. Also the car seat cover of the present invention has sufficient elasticity to provide a correct fit.

Modification and variations as would be deemed obvious to the person skilled in the art are included within the ambit of the present invention as claimed in the appended claims.

The invention claimed is:

1. A removable car seat cover for installation over an upholstered car seat having an integral side airbag, the car seat cover comprising:
    a side panel having a predetermined pre-weakened failure zone pretreated by controlled laser ablation of the side panel;
    wherein the pre-weakened failure zone defines an elongate strip extending along the side panel and is arranged such that the pre-weakened failure zone will be located at or adjacent to an airbag deployment area of a car seat when the car seat cover is installed on the car seat;
    the pre-weakened failure zone having a known bursting strength to thereby allow for reliable deployment of the side airbag from the car seat as a result of tearing of the pre-weakened failure zone when the removable car seat cover is installed thereon.

2. The removable car seat cover of claim 1, wherein the pre-weakened failure zone comprises at least one of:
    a width of approximately 7 mm; or
    a length of approximately 740 mm.

3. The removable car seat cover of claim 1, wherein the pre-weakened failure zone comprises at least one of:
    a laser-etched dot pattern; or
    a series of parallel laser-etched lines.

4. The removable car seat cover of claim 3, wherein:
    the laser-etched dot pattern has a dot color of K40 and a dot density of 400 dpi; or
    the laser-etched lines are spaced about 0.5 mm apart, and at a 45 degree angle to an edge of the pre-weakened failure zone.

5. The removable car seat cover of claim 1, wherein the pre-weakened
    failure zone is positioned less than 15 mm from a front edge of the car seat cover when the car seat cover is installed on the car seat.

6. A removable car seat cover of claim 5, wherein the pre-weakened failure zone has a lower end positioned less than 100 mm from a bottom edge of the car seat cover when installed on the car seat.

7. The removable car seat cover of claim 1, wherein the pre-weakened failure zone has a bursting strength of approximately 200 kPa.

8. The removable car seat cover of claim 1, wherein the side panel is made from a knitted polyester fabric.

9. The removable car seat cover according to claim 8, wherein the polyester fabric has a weight of 100 grams per square meter, and is 100 denier polyester yarn with 38 filaments in one yarn.

10. A method of producing a removable car seat cover for installation over an upholstered car seat having an integral side airbag, the method comprising:
    obtaining a removable car seat cover having at least one side panel; and
    pretreating the at least one side panel by controlled laser ablation to thereby form at least one predetermined pre-weakened failure zone in the form of an elongate strip extending along the at least one side panel and having a known bursting strength;
    the pre-weakened failure zone arranged on the at least one side panel such that pre-weakened failure zone will be located at or adjacent to an airbag deployment area of a car seat when the car seat cover is installed on the car seat.

11. The method of claim 10, wherein pretreating the at least one side panel includes pretreating an area comprising at least one of:
    a width of approximately 7 mm; or
    a length of approximately 740 mm.

12. The method of claim 10, wherein pretreating the at least one side panel comprises laser etching at least one of:
    a dot pattern; or
    a series of parallel lines.

13. The method of claim 12, wherein:
    the laser-etched dot pattern has a dot color of K40 and a dot density of 400 dpi; or
    the laser-etched lines are spaced about 0.5 mm apart, and at a 45 degree angle to an edge of the pre-weakened failure zone.

14. The method of claim 10, wherein pretreating the at least one side panel comprises includes pretreating an area such that at least one of:
    the pre-weakened failure zone is positioned less than 15 mm from a front edge of the car seat cover when the car seat cover is installed on the car seat; or
    the pre-weakened failure zone has a lower end positioned less than 100 mm from a bottom edge of the car seat cover when installed on the car seat.

15. The method of claim 10, wherein the pre-weakened failure zone has a bursting strength of approximately 200 kPa.

16. The method of claim 10, wherein the side panel comprises a knitted polyester fabric.

17. The method of claim 16, wherein the polyester fabric has a weight of 100 grams per square meter, and is 100 denier polyester yarn with 36 filaments per yarn.

* * * * *